US008724516B2

(12) United States Patent
Young et al.

(10) Patent No.: US 8,724,516 B2
(45) Date of Patent: May 13, 2014

(54) UNIFYING CONNECTED DOMINATING SET USING LOCALIZED TWO HOP INFORMATION WITH A FLEXIBLE DOMINATING FACTOR

(75) Inventors: Charles D. Young, Plano, TX (US); Alan D. Amis, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 232 days.

(21) Appl. No.: 13/267,423

(22) Filed: Oct. 6, 2011

(65) Prior Publication Data

US 2013/0089002 A1    Apr. 11, 2013

(51) Int. Cl.
*H04L 12/28* (2006.01)
(52) U.S. Cl.
USPC .................................... 370/255; 370/338
(58) Field of Classification Search
USPC ......................... 370/238, 255, 338
See application file for complete search history.

(56) References Cited

U.S. PATENT DOCUMENTS

| | | | | |
|---|---|---|---|---|
| 7,286,480 | B2 * | 10/2007 | Carpenter et al. | 370/238 |
| 7,397,810 | B1 * | 7/2008 | Young et al. | 370/431 |
| 7,551,895 | B1 * | 6/2009 | VanLaningham et al. | 455/41.2 |
| 7,573,835 | B2 * | 8/2009 | Sahinoglu et al. | 370/255 |
| 7,580,382 | B1 * | 8/2009 | Amis et al. | 370/310 |
| 7,606,171 | B1 * | 10/2009 | Young et al. | 370/254 |
| 7,639,708 | B1 * | 12/2009 | Snodgrass et al. | 370/458 |
| 7,826,372 | B1 * | 11/2010 | Mabe et al. | 370/237 |
| 8,023,435 | B2 * | 9/2011 | Tang et al. | 370/256 |
| 8,199,677 | B1 * | 6/2012 | Amis et al. | 370/255 |
| 8,233,463 | B2 * | 7/2012 | Yang | 370/338 |
| 8,312,052 | B2 * | 11/2012 | Larriba Pey et al. | 707/798 |
| 2003/0204625 | A1 * | 10/2003 | Cain | 709/243 |
| 2005/0169196 | A1 * | 8/2005 | Carpenter et al. | 370/255 |
| 2006/0253747 | A1 * | 11/2006 | Gillies et al. | 714/712 |
| 2008/0267106 | A1 * | 10/2008 | Buddhikot et al. | 370/312 |
| 2008/0310325 | A1 * | 12/2008 | Yang | 370/254 |

OTHER PUBLICATIONS

Acharya, Tamaghna, et al., "Distributed Algorithm for Power Aware Minimum Connected Dominating Set for Routing in Wireless Ad Hoc Network", Proceedings of the 2005 International conference on Parallel Processing workshops (ICPPW '05), IEEE Computer Society, 2005.

Jain, Ankur, et al., "A Distributed Self-Stabilizing Algorithm for Finding a Connected Dominating Set in a Graph", Proceedings of the Sixth Internaitonal Conference on Parallel and Distributed Computing, Applications and Technologies (PDCAT '05), IEEE Computer society, 2005.

Kim, Donghyun, et al., "Constructing Minimum Connected Dominating Sets with Bounded Diameters in Wireless Networks", IEEE Transactions on Parallel and Distributed Systems, vol. 20, No. 2, Feb. 2009, IEEE Computer Society.

(Continued)

*Primary Examiner* — Brian O'Connor
(74) *Attorney, Agent, or Firm* — Donna P. Suchy; Daniel M. Barbieri

(57) ABSTRACT

The present disclosure is directed to a method for forming a connected dominating set (CDS) for a graph. The method may include directing each node of the graph to broadcast a dominating factor and neighboring node information; identifying a dominating set based on the dominating factor of each node in comparison with dominating factors of neighboring nodes according to a dominating set rule definition; identifying a connecting set for connecting nodes according to a connecting set rule definition; and forming the CDS as a union of the dominating set and the connecting set.

20 Claims, 4 Drawing Sheets

(56) References Cited

OTHER PUBLICATIONS

Raghavan, V. Narasimha, et al., "Simple and Efficient Backbone Algorithm for Calculating Connected Dominating Set in Wireless Adhoc Networks", World Academy of Science, Engineering and Technology 33 2007, pp. 242-249.

Stojmenovic, Ivan, et al., "Dominating Sets and Neighbor Elimination-Based Broadcasting Algorithms in Wireless Networks", IEEE Transactions on Parallel and Distributed Systems, vol. 13, No. 1, Jan. 2002, pp. 14-25, IEEE.

Wu, Jie, et al., "Extended Multipoint Relays to Determine Connected Dominating Sets in MANETs", IEEE Transactions on Computers, vol. 55, No. 3, Mar. 2006, pp. 334-347.

Wu, Yiwei, et al., "Constructin Algorithms for k-Connected m-Dominating Sets in Wireless Sensor Networks", MobiHoc '08, May 26-30, 2008, Hong Kong SAR, China, 2008 ACM.

Ingelrest, Francois, et al., "Smaller Connected Dominating Sets in Ad Hoc and Sensor Networks based on Coverage by Two-Hop Neighbors", IEEE, 2007.

Wu, Jie, et al., "Extended Multipoint Relays to Determine Connected Dominating Sets in MANETs", pp. 621-630, IEEE, 2004.

Bhattacharjee, Subhasis, et al., "Distributed Algorithm for Power Aware Connected Dominating Set for Efficient Routing in Mobile Ad Hoc Networks", pp. 69-74, IEEE, 2006.

Wu, Jie, et al., "A Transmission Range Reduction Scheme for Power-Aware Broadcasting in Ad Hoc Networks Using Connected Dominating Sets", pp. 2906-2909, IEEE, 2003.

Wu, Jie, et al., "On Calculating Power-Aware Connected Dominating Sets for Efficient Routing in Ad Hoc Wireless Networks", Journal of Communications and Networks, vol. 4, No. 1, Mar. 2002, KICS, 2002.

Rai, M., et al., "A New Heuristic Approach to Minimum Connected Dominating Set in Adhoc Wireless Networks", 2009 IEEE International Advance Computing Conference (IACC 2009), Patiala, India, Mar. 6-7, 2009, pp. 284-289, IEEE, 2008.

"Routing in Ad-Hoc Networks Using Minimum Connected Dominating Sets" (Das B et al.) Coordinated Science Laboratory, University of Illinois at Urbana-Champaign, 1997 IEEE, p. 376 col. 2, p. 378, cols. 1-2.

"Appliction oriented connected dominating set-based cluster formation in wireless sensor networks" (Anitha V et al.) Dec. 3, 2010, p. 6, col. 2, p. 8, col. 1, p. 12, col. 1 to p. 13 col. 1.

* cited by examiner

UNIFYING CONNECTED DOMINATING SET USING LOCALIZED TWO HOP INFORMATION WITH A FLEXIBLE DOMINATING FACTOR

TECHNICAL FIELD

The present disclosure relates generally to graph theory in communications and information technology systems and more particularly to a method for identifying a connected dominating set in a graph.

BACKGROUND

The study of graphs, or graph theory, is used in communications and information technology systems for various purposes. A graph refers to a collection of nodes (or vertices) and a collection of edges that connect pairs of nodes. A dominating set DS for a graph G is a set of nodes in G such that every node not in DS is joined to at least one member of DS by some edge. That is, each node in G is either a member of the dominating set DS or 1 hop away from a member node (may also be referred to as a dominating node). It is noted that a dominating set may include disjoint sets of nodes in the graph.

A connected dominating set (CDS) of a graph G includes a dominating set and a set of connecting nodes that may be needed to connect disjoint nodes in the dominating set. CDSs have traditionally been used in mobile ad-hoc networks for routing applications. For instance, broadcast and multicast protocols may efficiently reach all destinations by restricting transmissions to nodes that are members of the CDS (instead of every node in the graph). In addition to routing, mobile ad-hoc networks may benefit from CDSs in other areas including channel access, link adaptation, energy consumption, power control, dynamic resource management and the like.

Since a given graph may have more than one CDS, it may be beneficial to identify a CDS with minimum number of elements (e.g., nodes and/or edges). Such a CDS may be referred to as a minimum connected dominating set (MCDS). However, it has been shown that the computation complexity of minimum connected dominating set problem (MCDS), and minimum dominating set problem (MDS) in general, is NP-complete. Therein lies a need for a system and method capable of efficiently identifying a CDS with the number of elements as close to the minimum number as possible.

SUMMARY

The present disclosure is directed to a method for forming a connected dominating set (CDS) for a graph. The method may include directing each node of the graph to broadcast a dominating factor and neighboring node information; identifying a dominating set based on the dominating factor of each node in comparison with dominating factors of neighboring nodes according to a dominating set rule definition; identifying a connecting set for connecting nodes according to a connecting set rule definition; and forming the CDS as a union of the dominating set and the connecting set.

In addition, the method may include applying an exception rule prior to identifying the connecting set. The exception rule is configured for excluding certain nodes from the connecting set based on the exception rule.

Furthermore, the method may include applying a not-CS rule prior to identifying the connecting set. The not-CS rule is configured for excluding a node from the connecting set if all neighboring nodes of said node are directly connected. In a particular embodiment, the not-CS rule may be applied prior to the exception rule, followed by the identification of the connecting set.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure is directed to a method for efficiently identifying a connected dominating set (CDS) for a graph. The method in accordance with the present disclosure, referred to as unifying connected dominating set (UCDS), is a heuristic that efficiently forms a stable CDS for a given graph with low message overhead and many times generates the minimum connected dominating set (MCDS) for that graph.

The method in accordance with the present disclosure is a distributed, localized processing method that relies on 2-hop neighbor information. That is, each node in the graph may broadcast a list of its neighbors. A set of dominating nodes and a set of connecting nodes may then be identified based on the neighbor information and in accordance to the identification rules. The identified dominating nodes and connecting nodes may form the connected dominating set in accordance with the present disclosure. The method in accordance with the present disclosure may also take into account a dominating factor d for each node during the process. The dominating factor d for a particular node may represent its neighbor degree (i.e. the number of direct neighbors), but may also represent various other metrics including available CPU MIPS or memory, maximum available data rate, remaining battery power, or even some combination of metrics like the product of remaining battery power and neighbor degree. The following description will first describe the method for identifying a connected dominating set in accordance with the present disclosure, and then describe the dominating factors in more details.

Figure 1:
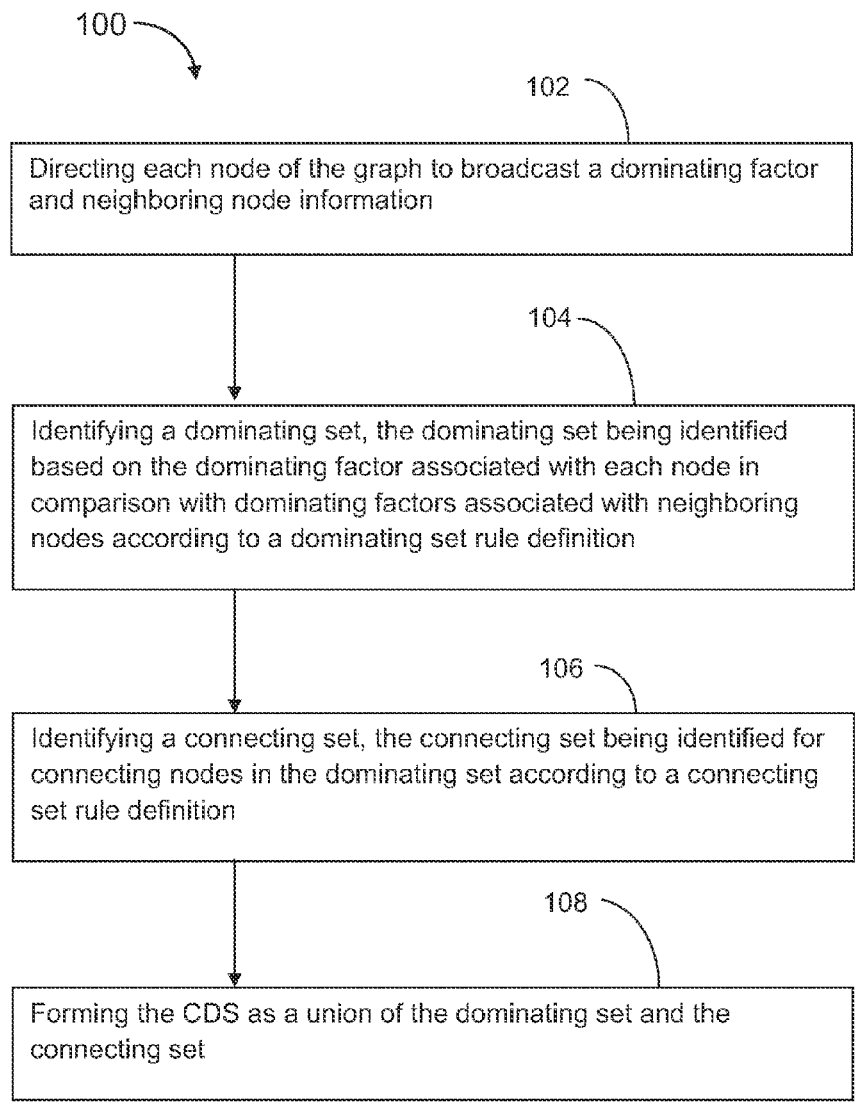
FIG. 1 is a flow chart illustrating a method for identifying a connected dominating set (CDS) for a graph.

Referring to FIG. 1, a flow diagram illustrating steps performed by a method 100 for forming a connected dominating set for a graph is shown. In one embodiment, each node in the graph may broadcast its dominating factor and the neighboring node information (e.g., a list of its neighbors) in step 102.

Step 104 may then identify a set of dominating nodes based on the information provided. For instance, the set of dominating nodes may be identified according to a dominating set rule definition (DS rule):

$$i \in DS \Rightarrow \begin{pmatrix} (\forall j \in N_i(d_i > d_j \vee (d_i = d_j \wedge i > j)) \vee \\ (\exists j \in N_i \ni \forall k \in N_j \\ (d_i > d_k \vee (d_i = d_k \wedge i > k)) \end{pmatrix}$$

That is, a node i is designated as a member of the dominating set DS if:
 node i has the highest dominating factor ($d_i$) among its neighbors j, in which case node i designates itself; or
 a neighbor j finds that node i has the highest dominating factor among its neighbors k, in which case node j designates node i.

It is contemplated that step 104 may be performed in a distributed, localized manner. For instance, each node may be associated with a process that compares its dominating factor against the dominating factors of its neighbors and determines if it or any of its neighbors should be designated as a member of DS according to the DS rule described above. If the dominating factor of a node is identical to a neighbor's, their node IDs may be used to break the tie.

Step 106 may identify a set of connecting nodes (may also be referred to as a connecting set, or CS) that may be needed to connect disjoint nodes (if any) in the dominating set. The set of connecting nodes may be identified according to a connecting set rule definition (CS rule):

$$i \in CS' \Rightarrow i \cup DS \wedge (i \in DS \vee k \in DS) \wedge (\exists j, k \square N_i \ni DSN_j \cap DSN_k = \phi)$$

$$i \in CS \Rightarrow i \in CS' \wedge \forall n \neq i \in CS'(d_i > d_n \vee (d_i = d_n \wedge i > n))$$

That is, a node i with neighbors $N_i$ is a candidate member of the CS (CS') if it is not a member of the DS and it has neighbors j and k, at least one of which is a member of the DS, whose sets of DS neighbors ($DSN_j$ and $DSN_k$, which includes j or k if they are a DS member), are disjoint. Among the common neighbors of nodes j and k that belong to CS', known as "CS twins", the one with the highest dominating factor (d) (or highest node ID if equal), becomes the single CS node. It is contemplated that step 106 may also be performed in a distributed, localized manner. It is also contemplated that step 106 may be performed after step 104 to reduce processing time.

Once the dominating set DS and the connecting set CS are identified according to the rules defined above, step 108 may form the unifying connected dominating set (UCDS) as the union of DS and CS (i.e., UCDS=DS U CS'). The connecting set CS identified according to the CS rule connects the disjoint nodes (if any) in the dominating set DS, therefore, the union of DS and CS forms a connected set of dominating nodes (i.e., a CDS for the graph). The CDS formed in this manner may be used in various types of applications without departing from the spirit and scope of the present disclosure.

Figure 2:
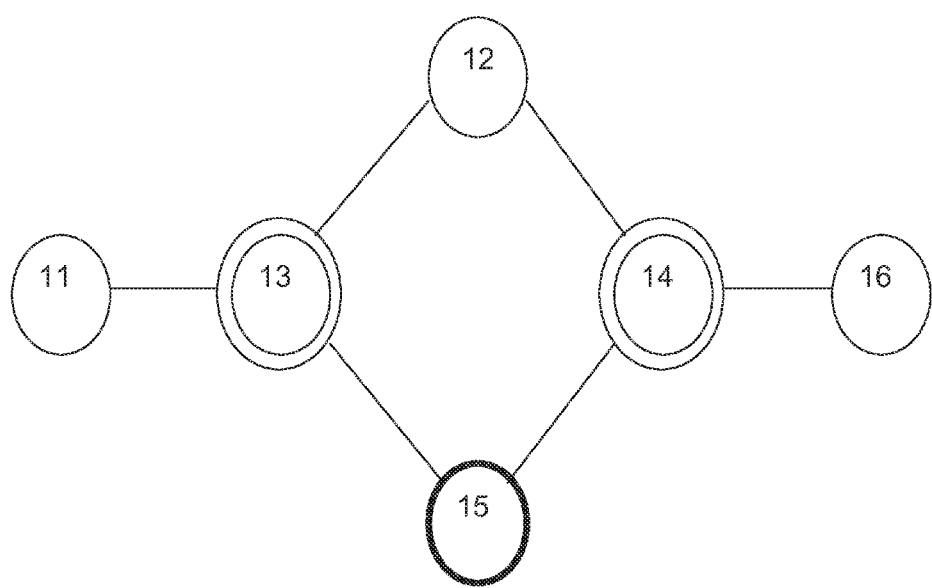
FIG. 2 is an illustration depicting an exemplary topology (graph) with identified dominating set and connecting set.

FIG. 2 is an exemplary topology depicting the dominating set DS (including member nodes 13 and 14) identified in step 104 and the connecting set CS (including member node 15) identified in step 106. In the case of identifying the connecting node according to the CS rule, both nodes 12 and 15 are members of the candidate set CS' and both may serve equally well, but their node IDs are used to break the tie and node 15 is selected in this example. The CDS formed in step 108 may therefore include nodes 13, 14 and 15.

Figure 3:
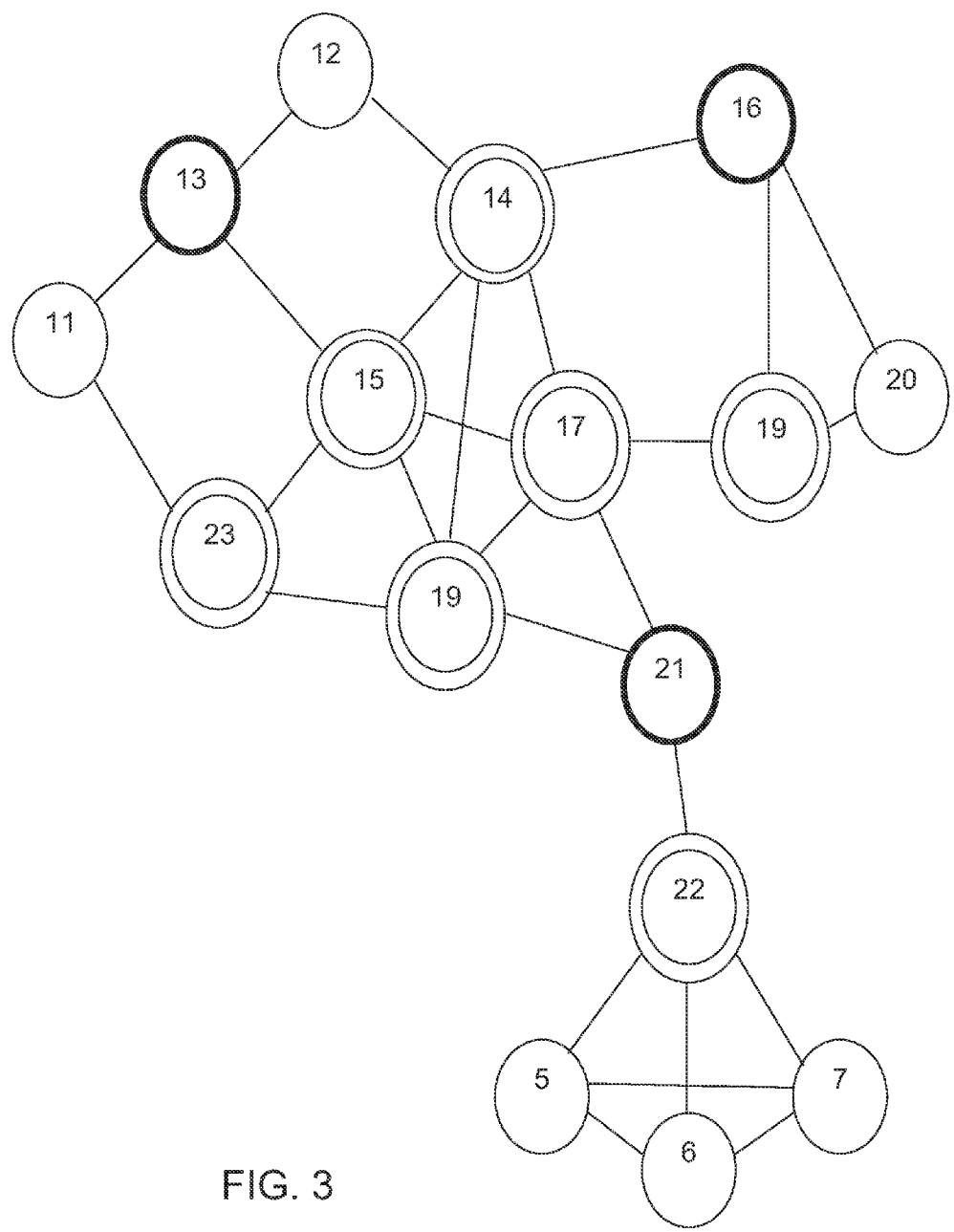
FIG. 3 is an illustration depicting another exemplary topology (graph) with identified dominating set and connecting set.

It is understood that there may be cases where the connecting set CS is empty. That is, the dominating set DS identified in step 104 may already be a connected set of nodes. It is also contemplated that there may be cases where the CS rule as defined above may create unnecessary connecting nodes. For example, FIG. 3 is an exemplary topology depicting the dominating set DS (member nodes are indicated using double lines) identified in step 104 and the connecting set CS (member nodes are indicated using bolded lines) identified in step 106. More specifically, nodes 13, 16 and 21 are identified as connecting nodes according to the CS rule defined above. However, nodes 13 and 16 are not necessary for connecting the two disjoint sets of dominating nodes. Therefore, an exception rule may be applied prior to or concurrent with step 106 to exclude these nodes if it is desirable to reduce the number of connecting nodes. The exception rule may be defined as:

$$i \notin CS \Rightarrow (\neg \exists l, m \in N_i \Rightarrow i \in CS)$$

$$\wedge \begin{pmatrix} (\exists n \in CS \ni n \in DSN_j \cap DSN_k) \vee \\ (j \notin DS \wedge DSN_i \cap DSN_j \neq \phi) \vee \\ (k \notin DS \wedge DSN_i \cap DSN_k \neq \phi) \end{pmatrix}$$

That is, the CS rule can be ignored for node i if:
 one of the common neighbors of j or k is already a CS node or if
 one of j or k is not a DS node and node i shares a common DS neighbor with that node,
unless the CS rule applies to another pair of neighbors l and m (without this exception).

Figure 4:
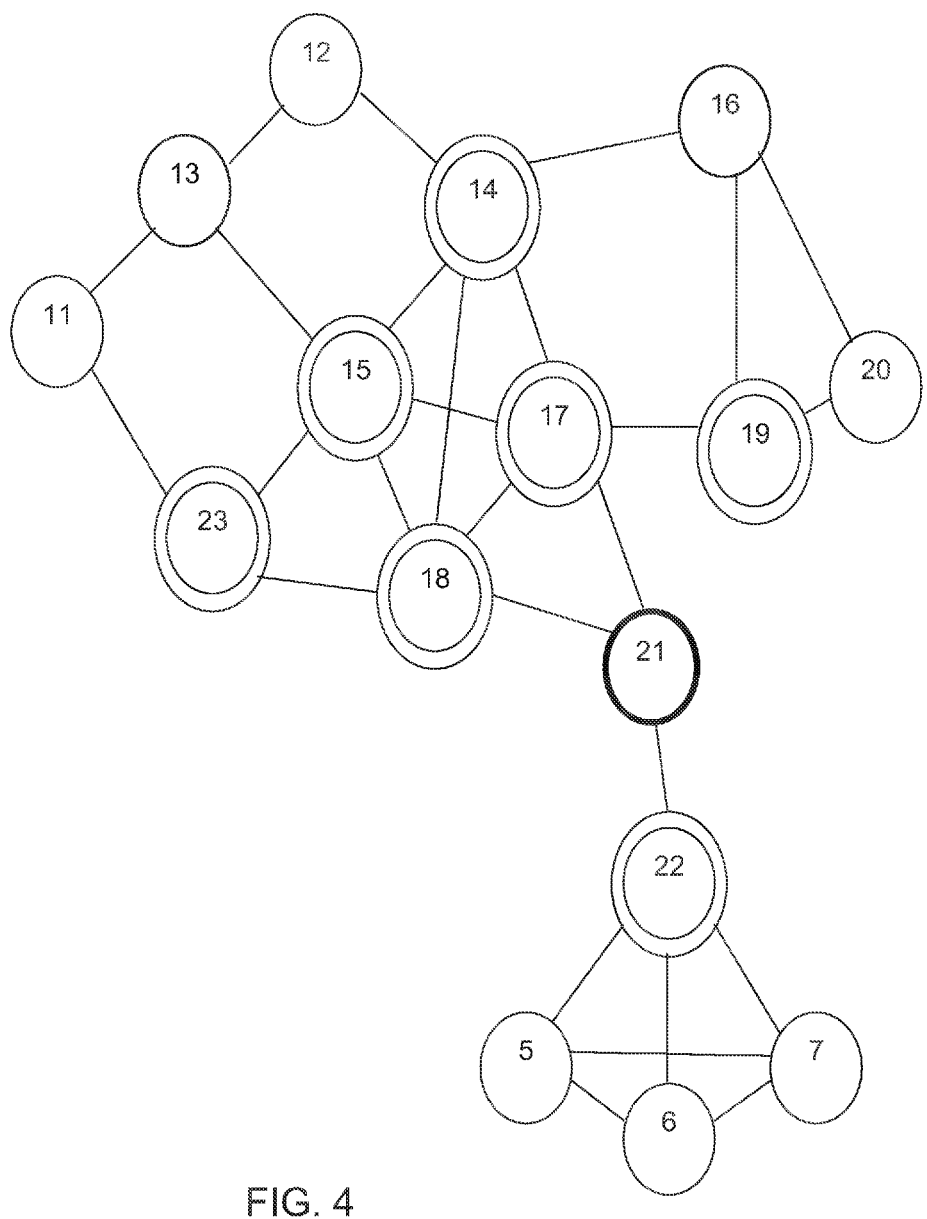
FIG. 4 is an illustration depicting the exemplary topology (graph) of FIG. 3, wherein an exception rule is applied for the connecting set.

FIG. 4 shows the result if the exception rule is applied to the same topology. It is noted that node 13 and node 16 fall under the exception rule. More specifically, node 13 can be excluded from the connecting set CS because neither node 11 nor 12 is a member of the dominating set DS (whose member nodes are indicated using double lines for illustrative purposes). In addition, node 16 can also be excluded from the connecting set CS because node 20 (a neighbor of node 16 that is not a member of DS) shares a common dominating set neighbor (i.e., node 19) with node 16. It is also noted that the exception rule as defined above only removes unnecessary connecting nodes. For instance, node 21 in this example does not fall under the exception rule; thus, node 21 remains a member of the connecting set CS. The CDS formed for this exemplary topology may therefore include the union of the dominating set members 14, 15, 17, 18, 19, 22, 23 and the connecting set member 21.

It is contemplated that certain pruning techniques may be applied to further enhance the performance of method 100. For instance, a not-CS rule may be applied after the DS rule (i.e., step 104) but before the CS rule (i.e., step 106) and the exception rule (if utilized). The not-CS rule may be defined as:

$$i \notin CS \Rightarrow \forall j, k \in N_i (j \in N_k \wedge k \in N_j)$$

That is, a node i is not a member of the connecting set CS if for all neighbors j and k, j and k are directly connected. Therefore, node i can be excluded from the process of step 106. Since a node cannot disconnect neighbors that are directly connected, applying the not-CS rule as defined above will not prevent the subsequent steps from connecting the dominating set DS.

It is further contemplated that particular implementation of method 100 may first apply the DS rule to identify the domination set; the not-CS rule may then be applied and followed by the exception rule; CS rule may be applied subsequently to identify the connecting set. This implementation further reduces the computational complexity of method 100 in comparison with other techniques for finding CDS for a graph. The method 100 is able to arrive at the final CDS faster without a reduction phase that is required in other conventional methods. In addition, since each node only needs to broadcast its local neighbor information, the message complexity of method 100 is keep low at $O(\Delta)$, where $\Delta$ represents the maximum number of neighbors in a graph. Furthermore, for a static network (graph) and a constant set of dominating factors, method 100 in accordance with the present disclosure converges to a single CDS solution, providing stability which may be appreciated (and sometimes required) in various applications.

It is also contemplated that certain applications may required redundant CDS nodes for fault tolerance purposes. It is possible to modify the DS rule defined above to allow two or more dominating nodes for every node in the graph. For instance, the modified DS rule (mDS rule) may state that a node i is a member of the DS if:

it has at least the $m^{th}$ highest dominating factor ($d_i$) among its neighbors j, in which case node i designates itself, or a neighbor j finds that node i has at least the $m^{th}$ highest dominating factor among its neighbors k, in which case node j designates node i.

It is noted that there is no increase in either computational or message complexity for the increased fault tolerance. The mDS rule allows the number of DS nodes (and hence the CDS nodes) to be increased, providing redundancy and fault tolerance which may be appreciated in certain applications.

As mentioned previously, the method in accordance with the present disclosure takes into account a dominating factor d for each node during the process. Traditionally the goal of a CDS algorithm has been to select the nodes with the richest connectivity so as to minimize the size of the CDS. Therefore, conventional techniques primarily take into account only the neighbor degree information. The method in accordance with the present disclosure is configured to allow flexible dominating factors. That is, a dominating factor may be anything that may help optimizing the operations of a particular network or even a particular deployment of a network. Furthermore, for maximum flexibility, the dominating factor may be made configurable to the extent that all possible metrics of interest are available to a network planner, who may then apply a priority and weighting factor to each metric to reflect the desired influence it would have on the CDS selection.

For instance, one or more of the following metrics may be considered as a part of the dominating factor for a node:

neighbor degree;
remaining battery level;
average data rate—nodes with more processing power or higher link qualities may be able to send at higher rates;
CPU MIPS rating—nodes with more powerful CPUs may process more traffic; and
available queue space—nodes with more queue space may have lower latency and suffer less packet loss.

At configuration time, the network planner may configure the following choices for weight and priority:

| Metric | Weight | Priority |
| --- | --- | --- |
| neighbor degree ($\Delta$) | .25 | 2 |
| remaining battery level (rbl) | .5 | 1 |

-continued

| Metric | Weight | Priority |
| --- | --- | --- |
| average data rate (adr) | .25 | 3 |
| CPU MIPS rating (cmr) | 0 | 4 |
| available queue space (aqs) | 0 | 5 |

In which case the method may create a combined dominating factor as follows:

| Most significant bits | | Least significant bits |
| --- | --- | --- |
| rbl * .5 | $\Delta$ * .25 | adr * .25 |

It is noted that, for a particular topology, certain factors may be constant (e.g. $\Delta$) while others may be changing over time (e.g. rbl). Thus, depending on the metrics selected, the CDS may be static for a given topology or morph over time. For those metrics that are changing, it is contemplated that they may be smoothed so as not to introduce unnecessary thrashing in the CDS membership. With proper smoothing, the flexible dominating factor will allow the CDS to converge to a unique, stable solution. It is understood that the above example is merely exemplary for describing the flexible dominating factor. Other factors may also be taken into consideration without departing from the spirit and scope of the present disclosure.

Furthermore, the flexible dominating factors provide an opportunity for creating more than one CDS running in parallel in the same network to support applications that have different requirements. For example, one application may generate a constant low level of traffic that is not sensitive to latency and may therefore be optimized for maximum battery life. Another application may generate brief bursts of traffic that are time sensitive (requires low latency). The formula for calculating the flexible dominating factors for the first application may prioritize remaining battery life, and the formula for calculating the flexible dominating factors for the second application may prioritize neighbor degree to be more important in order to generate shorter routing paths. The method in accordance with the present disclosure is able to accommodate both applications by simply directing the nodes to publish/broadcast two or more flexible dominating factors with its lists of neighbors.

The method in accordance with the present disclosure may be utilized for various purposes, including communications and information technology systems. For example, the method may be utilized in broadcast and multicast protocols. The UCDS formed according to the rules defined above may be used to disseminate routing information. Non-UCDS members do not need to transmit routing information, thereby reducing routing overhead. The UCDS may also be used to perform network wide broadcast and multicast transmissions. It is contemplated that other types of applications may also benefit from using the UCDS formed according to the rules defined above. Such applications may include, but not limited to, network channel access, link adaptation, energy consumption, power control, dynamic resource management and the like.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for forming a connected dominating set (CDS) for a graph, the method comprising:
    directing each node of the graph to broadcast a dominating factor and neighboring node information;
    identifying a dominating set, the dominating set being identified based on the dominating factor of each node in comparison with dominating factors of neighboring nodes according to a dominating set rule definition;
    identifying a connecting set, the connecting set being identified for connecting nodes in the dominating set according to a connecting set rule definition; and
    forming the CDS as a union of the dominating set and the connecting set.

2. The method of claim 1, wherein a particular node i is identified as a member of the dominating set according to the dominating set rule definition:

$$i \in DS \Rightarrow \begin{pmatrix} (\forall\, j \in N_i (d_i > d_j \vee (d_i + d_j \wedge i > j)) \vee \\ (\exists\, j \in N_i \ni \forall k \in N_j \\ (d_i > d_k \vee (d_i = d_k \wedge i > k)) \end{pmatrix}$$

wherein:
    DS is the dominating set;
    i, j and k are nodes within the graph; and
    $d_i$, $d_j$ and $d_k$ are the dominating factors of nodes i, j and k, respectively.

3. The method of claim 1, wherein a particular node i is identified as a member of the connecting set according to the connecting set rule definition:

$i \in CS \Rightarrow i \notin DS \wedge (j \in DS \wedge k \in DS) \wedge (\exists j, k \in N_i \ni DSN_j \cap DSN_k = \phi)$ $i \in CS \Rightarrow i \in CS' \wedge \forall n \neq i \in CS' (d_i > d_n \vee (d_i = d_n \wedge i > n))$ wherein:
    DS is the dominating set;
    CS is the connecting set;
    CS' is the candidate set for CS;
    i, j, k and n are nodes within the graph;
    $N_i$ represents a set of neighbors of node i;
    $DSN_j$ and $DSN_k$ represent sets of DS neighbors of nodes j and k, respectively; and
    $d_i$ and $d_n$ are the dominating factors of nodes i and n, respectively.

4. The method of claim 1, further comprising:
    applying an exception rule prior to identifying the connecting set, the exception rule is configured for excluding a particular node i according to the exception rule:

$$i \notin CS \Rightarrow (\neg \exists\, l, m \in N_i \Rightarrow i \in CS)$$

$$\wedge \begin{pmatrix} (\exists\, n \in CS \ni n \in DSN_j \cap DSN_k) \vee \\ (j \notin DS \wedge DSN_i \cap DSN_j \neq \phi) \vee \\ (k \notin DS \wedge DSN_i \cap DSN_k \neq \phi) \end{pmatrix}$$

wherein:
    DS is the dominating set;
    CS is the connecting set;
    i, j, k, l and m are nodes within the graph;
    $N_i$ represents a set of neighbors of node i; and
    $DSN_j$ and $DSN_k$ represent sets of DS neighbors of nodes j and k, respectively.

5. The method of claim 1, further comprising:
    applying a not-CS rule prior to identifying the connecting set, the not-CS rule is configured for excluding a particular node i from the connecting set according to the not-CS rule:

$i \notin CS \Rightarrow \forall j, k \in N_i (j \in N_k \wedge k \in N_j)$ wherein:
    CS is the connecting set;
    i, j and k are nodes within the graph;
    $N_i$, $N_j$ and $N_k$ represent sets of neighbors of nodes i, j and k, respectively.

6. The method of claim 1, wherein the dominating set rule definition is configured for providing fault tolerance for the dominating set, wherein a particular node i is identified as a member of the dominating set if:
    the dominating factor of said particular node i is at least the $m^{th}$ highest in comparison with dominating factors of the neighboring nodes of said particular node i; or
    a neighboring node j of said particular node i determines that the dominating factor of said particular node i is at least the $m^{th}$ highest in comparison with dominating factors of the neighboring nodes of node j.

7. The method of claim 1, wherein the dominating factor of each node is calculated according to a formula specified for a particular application.

8. The method of claim 7, wherein each node is further directed to broadcast a second dominating factor calculated according to a second formula specified for a second application, allowing formation of a second CDS to be executed in parallel with formation of the first mentioned CDS.

9. A method for forming a connected dominating set (CDS) for a graph, the method comprising:
    directing each node of the graph to broadcast a dominating factor and neighboring node information;
    identifying a dominating set for the graph according to the dominating set rule definition:

$$i \in DS \Rightarrow \begin{pmatrix} (\forall\, j \in N_i (d_i > d_j \vee (d_i = d_j \wedge i > j)) \vee \\ (\exists\, j \in N_i \ni \forall k \in N_i \\ (d_i > d_k \vee (d_i = d_k \wedge i > k)) \end{pmatrix}$$

wherein:
    DS is the dominating set;
    j and k are nodes within the graph; and
    $d_i$, $d_j$ and $d_k$ are the dominating factors of nodes i, j and k, respectively;
    identifying a connecting set for connecting the nodes in the dominating set according to the connecting set rule definition:

$$i \in CS' \Rightarrow i \notin DS \wedge (j \in DS \vee k \in DS) \wedge (\exists j, k \in N_i \ni DSN_j \cap DSN_k = \phi)$$

$$i \in CS \Rightarrow i \in CS' \wedge \forall n \neq i \in CS'(d_i > d_n \vee (d_i = d_n \wedge i > n))$$

wherein:
DS is the dominating set;
CS is the connecting set;
CS' is the candidate set for CS;
i, j, k and n are nodes within the graph;
$N_i$ represents a set of neighbors of node i;
$DSN_j$ and $DSN_k$ represent sets of DS neighbors of nodes j and k, respectively; and
$d_i$ and $d_n$ are the dominating factors of nodes i and n, respectively; and
forming the CDS as a union of the dominating set and the connecting set.

10. The method of claim 9, further comprising:
applying a not-CS rule prior to identifying the connecting set, the not-CS rule is configured for excluding a particular node i from the connecting set according to the not-CS rule:

$$i \notin CS \Rightarrow \forall j, k \in N_i (j \in N_k \wedge k \in N_j)$$

wherein:
CS is the connecting set;
i, j and k are nodes within the graph;
$N_i$, $N_j$ and $N_k$ represent sets of neighbors of nodes i, j and k, respectively.

11. The method of claim 9, further comprising:
applying an exception rule prior to identifying the connecting set, the exception rule is configured for excluding a particular node i according to the exception rule:

$$i \notin CS \Rightarrow (\neg \exists l, m \in N_i \Rightarrow i \in CS)$$

$$\wedge \begin{pmatrix} (\exists n \in CS \ni n \in DSN_j \cap DSN_k) \vee \\ (j \notin DS \wedge DSN_i \cap DSN_j \neq \phi) \vee \\ (k \notin DS \wedge DSN_i \cap DSN_k \neq \phi) \end{pmatrix}$$

wherein:
DS is the dominating set;
CS is the connecting set;
i, j, k, l and m are nodes within the graph;
$N_i$ represents a set of neighbors of node i; and
$DSN_j$ and $DSN_k$ represent sets of DS neighbors of nodes j and k, respectively.

12. The method of claim 9, wherein the dominating factor of each node is calculated according to a formula specified for a particular application.

13. The method of claim 12, wherein each node is further directed to broadcast a second dominating factor calculated according to a second formula specified for a second application, allowing formation of a second CDS to be executed in parallel with formation of the first mentioned CDS.

14. A method for forming a connected dominating set (CDS) for a graph, the method comprising:
directing each node of the graph to broadcast a dominating factor and neighboring node information;
identifying a dominating set, the dominating set being identified based on the dominating factor of each node in comparison with dominating factors of neighboring nodes according to a dominating set rule definition;
identifying a connecting set for connecting the nodes in the dominating set, the identification of the connecting set further comprising:
reducing a number of nodes to be processed during the identification of the connecting set according to at least one of a not-CS rule or an exception rule; and
identifying the connecting set according to a connecting set rule definition; and
forming the CDS as a union of the dominating set and the connecting set.

15. The method of claim 14, wherein a particular node i is identified as a member of the dominating set according to the dominating set rule definition:

$$i \in DS \Rightarrow \begin{pmatrix} (\forall j \in N_i(d_i > d_j \vee (d_i = d_j \wedge i > j)) \vee \\ (\exists j \in N_i \ni \forall k \in N_j \\ (d_i > d_k \vee (d_i = d_k \wedge i > k)) \end{pmatrix}$$

wherein:
DS is the dominating set;
i, j and k are nodes within the graph; and
$d_i$, $d_j$ and $d_k$ are the dominating factors of nodes i, j and k, respectively.

16. The method of claim 14, wherein a particular node i is identified as a member of the connecting set according to the connecting set rule definition:

$$i \in CS \Rightarrow i \notin DS \wedge (j \in DS \vee k \in DS) \wedge (\exists j, k \in N_i \ni DSN_j \cap DSN_k = \phi)$$

$$i \in CS \Rightarrow i \in CS' \wedge \forall n \neq i \in CS'(d_i > d_n \vee (d_i = d_n \wedge i > n))$$

wherein:
DS is the dominating set;
CS is the connecting set;
CS' is the candidate set for CS;
i, j, k and n are nodes within the graph;
$N_j$ represents a set of neighbors of node i;
$DSN_j$ and $DSN_k$ represent sets of DS neighbors of nodes j and k, respectively; and
$d_i$ and $d_n$ are the dominating factors of nodes i and n, respectively.

17. The method of claim 14, wherein the not-CS rule is configured for excluding a particular node i from the connecting set according to the not-CS rule:

$$i \notin CS \Rightarrow \forall j, k \in N_i (j \in N_k \wedge k \in N_j)$$

wherein:
CS is the connecting set;
i, j and k are nodes within the graph;
$N_i$, $N_j$ and $N_k$ represent sets of neighbors of nodes i, j and k, respectively.

18. The method of claim 14, wherein the exception rule is configured for excluding a particular node i according to the exception rule:

$$i \notin CS \Rightarrow (\neg \exists l, m \in N_i \Rightarrow i \in CS)$$

$$\wedge \begin{pmatrix} (\exists n \in CS \ni n \in DSN_j \cap DSN_k) \vee \\ (j \notin DS \wedge DSN_i \cap DSN_j \neq \phi) \vee \\ (k \notin DS \wedge DSN_i \cap DSN_k \neq \phi) \end{pmatrix}$$

wherein:
DS is the dominating set;
CS is the connecting set;
i, j, k, l and m are nodes within the graph;
$N_j$ represents a set of neighbors of node i; and $DSN_j$ and $DSN_k$ represent sets of DS neighbors of nodes j and k, respectively.

19. The method of claim 14, wherein each node is further directed to broadcast a second dominating factor, wherein the first mentioned dominating factor of each node is calculated according to a first formula specified for a first application and the second dominating factor of each node is calculated according to a second formula specified for a second application, allowing formation of a second CDS to be executed in parallel with formation of the first mentioned CDS.

20. The method of claim 14, wherein the dominating set rule definition is configured for providing fault tolerance, wherein a particular node i is identified as a member of the dominating set if:

the dominating factor of said particular node i is at least the $m^{th}$ highest in comparison with dominating factors of the neighboring nodes of said particular node i; or a neighboring node j of said particular node i determines that the dominating factor of said particular node i is at least the $m^{th}$ highest in comparison with dominating factors of the neighboring nodes of node j.

* * * * *